Dec. 17, 1929.  C. F. M. VAN BERKEL  1,739,697

SLICING MACHINE FOR SLICING MEAT OR THE LIKE

Filed Aug. 12, 1926

Inventor
Cornelis F. M. van Berkel
by Nissen & Crane
Attorneys

Patented Dec. 17, 1929

1,739,697

UNITED STATES PATENT OFFICE

CORNELIS FRANCISCUS MARIA van BERKEL, OF WASSENAAR, NETHERLANDS, ASSIGNOR TO U. S. SLICING MACHINE COMPANY, OF LA PORTE, INDIANA, A CORPORATION OF INDIANA

SLICING-MACHINE FOR SLICING MEAT OR THE LIKE

Application filed August 12, 1926, Serial No. 128,805, and in the Netherlands May 27, 1925.

This invention relates to slicing machines having a work support or meat plate which is fed toward the cutting plane of the slicing knife by an intermittently operating feed screw, and has for one of its objects the provision of means for overcoming the effect of backlash in said feed screw in order to effect the production of uniform slices.

A further object is to provide a machine of the class named which shall be of improved construction and operation.

The invention is exemplified in the combination and arrangement of parts shown in the accompanying drawings and described in the following specification, and it is more particularly pointed out in the appended claims.

In the drawings—

Figure 1:
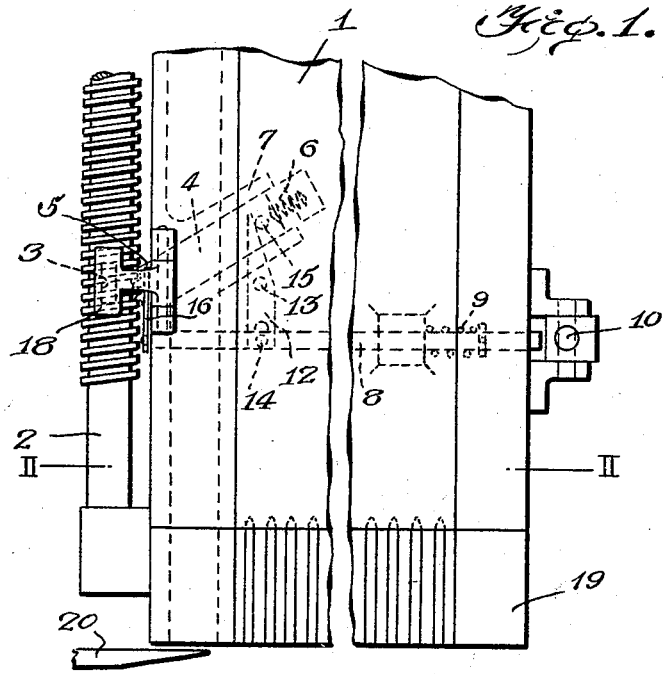
Fig. 1 is a fragmentary top plan view of a work supporting table showing one embodiment of the present invention applied thereto.
Figure 2:
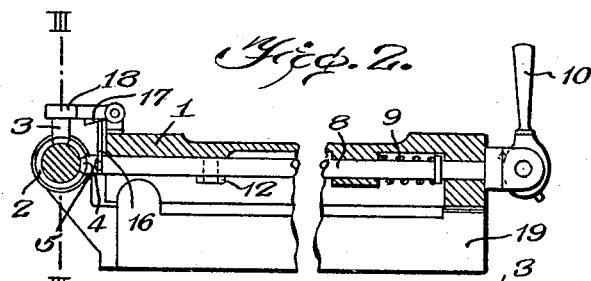
Fig. 2 is a vertical section substantially on line II—II of Fig. 1.
Figure 3:
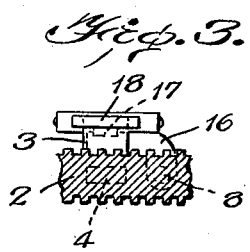
Fig. 3 is a section on line III—III of Fig. 2.

The numeral 1 designates the sliding work support or meat table of a slicing machine having a feed screw 2 for feeding the meat support toward the slicing knife 20. The screw may be intermittently operated in any well-known and approved manner. A segmental nut 3 is attached to the meat plate 1 by means of an arm 18 pivotally connected to the meat plate. A supplemental nut 4 is slidably mounted in guides 7 on the lower face of the meat plate 1 and is provided with teeth 5 which engage the rear faces of the threads on the feed screw 2, as shown more clearly in Fig. 4. The ways 7 are inclined at an oblique angle to the axis of the feed screw 2 and a spring 6 bears against the inner end of the supplemental nut 4 and exerts spring pressure, holding the teeth 5 in close contact with the threads of the screw 2. A rod 8 is slidably mounted beneath the meat plate 1 and extends transversely thereof and is provided with a spring 9 which holds the rod in retracted position shown in the drawings. A lever 10 is pivoted on the side of the meat plate, the lower end of the lever being cam-shaped for engaging the rod 8 and forcing it transversely of the meat plate 1 against the tension of the spring 9. A lever 12 is pivoted at 13 beneath the plate 1 and is provided with bifurcations for engaging a pin 14 on the rod 8. The opposite end of the lever 12 engages a pin 15 on the slide nut 4. When the lever 10 is rotated on its pivotal support the rod 8 is moved transversely of the table 1 and swings the lever 12 about its pivot 13 in a direction to retract the nut 4 and disengage the teeth 5 thereon from the threads of the screw 2. The rod 8 carries at its end adjacent the screw 2 a plate 16 which projects upwardly beneath the pivoted arm 18 in position to engage a cam-shaped projection 17 on the arm 18. At the same time that the rod 8 operates the lever 12 to retract the supplemental nut 4, the plate 16 will slide beneath the cam lug 17 and lift the nut 3 out of engagement with the teeth of the feed screw 2. In this way a single movement of the lever 10 will disengage both nuts from the feed screw and free the table to be moved by hand in either direction over its guiding support 19.

Figure 4:
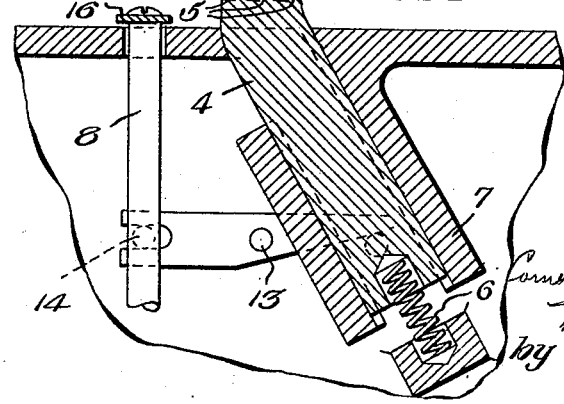
Fig. 4 is a horizontal sectional view showing the supplemental toothed nut on an enlarged scale.

It will be apparent that the force of the spring 6 will tend to move the meat plate 1 rearwardly along its guides. This backward movement will be limited by the teeth of the feed nut 3 which will thus be held tightly against the forward or feed faces of the threads on the screw 2, as illustrated in Fig. 4. Where the teeth of the screw 3 do not accurately fit the grooves between the threads on the screw 2 there will be space left at the front of the teeth which would permit slight movement of the table 1 upon its support independently of rotation of the feed screw. This lost motion due to backlash in the screw 2 is overcome by the spring-held nut 4 which maintains tight contact between the feed screw and the teeth of the feed nut at all times irrespective of the fact that there may be a loose fit between the engaging teeth of the nut and screw due to wear or other causes.

It will be noted from Fig. 4 that the rear faces of the teeth on the nut 4 are beveled or rounded so that the only contact between the teeth of the nut and the threads of the screw is on the front faces of the teeth of the nut and the rear faces of the screw threads.

I claim:—

1. In a slicing machine, a slicing knife, a work support, a screw thread for moving said work support, a nut on said work support for engaging said screw and rigidly held against movement relative to said work support in a direction toward the cutting plane of said slicing knife, and means for exerting resilient force between said screw thread and work support in a direction on said work support away from the cutting plane of said knife for overcoming backlash in said screw thread.

2. A slicing machine having a slicing knife, a carriage having a feed screw mounted thereon, a work support mounted to slide on said carriage, a feed nut secured to said work support and fixed thereon against movement relative to said support in a direction parallel with said feed screw and engaging said feed screw, and means for exerting spring pressure between said feed screw and work support in the direction of the axis of said feed screw said pressure acting on said support away from said slicing knife for holding the teeth of said nut closely against the feeding faces of the threads of said feed screw.

3. A slicing machine having a slicing knife and a work support, a feed screw for imparting feeding movement to said work support, a nut secured to said work support and rigidly held against movement relative to said support toward said slicing knife and having teeth thereon engaging the threads of said feed screw, a supplemental nut mounted on said work support and engaging the threads of said feed screw, and a spring for exerting force on said supplemental nut in the direction of the axis of said feed screw and acting on said support away from said slicing knife to hold the teeth of said feed nut in close contact with the feeding faces of the threads of said feed screw.

4. In a slicing machine, a slicing knife, a work support, a feed screw for moving said work support, a segmental nut mounted on said work support and releasably engaging said feed screw, a spring-held supplemental member for engaging the threads of said feed screw and acting thereon and on said work support in a direction to hold said feed nut in close engagement with the faces of said feed screw which feed said nut toward said slicing knife, and means for disengaging said feed nut and supplemental member from said feed screw to free said work support from said feed screw.

5. In a slicing machine, a slicing knife, a work support, a feed screw for moving said work support, a feed nut movably mounted on said work support for engaging the threads of said feed screw but fixed against relative movement therein in the direction of the axis of said feed screw, a supplement member having teeth thereon for engaging the threads of said feed screw, said supplemental member being mounted on said work support and slidable thereon at an oblique angle to the axis of said feed screw, and a spring for yieldingly pressing said supplemental member toward said feed screw and toward said knife to hold said feed nut and screw in close feeding relation to each other.

6. In a slicing machine, a work support, a feed screw for moving said work support, a feed nut movably mounted on said work support for engaging the threads of said feed screw, a supplemental member having teeth thereon for engaging the threads of said feed screw, said supplemental member being mounted on said work support and slidable thereon at an oblique angle to the axis of said feed screw, a spring for yieldingly pressing said supplemental member toward said feed screw to hold said feed nut and screw in close feeding relation to each other, means for disengaging said feed nut from said feed screw, means for retracting said supplemental member to disengage the teeth thereon from said feed screw, and a common operating device for said disengaging and retracting means.

7. In a slicing machine, a work support, a knife for slicing material held by said work support, a feed screw for moving said work support toward the cutting plane of said knife, a feed nut secured to said work support and fixed against movement thereon in the direction of the axis of said feed screw and engaging said feed screw, a supplemental device mounted on said work support and slidable thereon along guides inclined away from said feed screw and the cutting plane of said knife, and a spring for urging said supplemental member into engagement with the threads of said feed screw to hold said work support backwardly away from the cutting plane of said knife to the limit of the movement thereof in a backward direction permitted by the teeth of said feed nut.

8. In a slicing machine, a work support, a knife for slicing material held by said work support, a feed screw arranged substantially normal to the cutting plane of said knife, a supplemental nut pivotally mounted on said work support and movable into and out of engagement with the threads of said feed screw but fixed against movement relative to said support away from the cutting plane of said knife, a bar slidably mounted on said work support and inclined backwardly from the cutting plane of said knife and at an acute angle to the axis of said feed screw, said bar having teeth thereon engaging the rear faces of the threads of said feed screw, a spring for urging said bar toward said feed screw, a lever for retracting said bar from said feed screw, a manually operated device for moving said lever to release the teeth on said bar from said feed screw, and means connected with said manually operated device for releasing said feed nut from said feed screw.

9. In a slicing machine, a slicing knife, a work support, a screw-thread for moving said work support, a nut on said work support for engaging said screw and rigidly held against movement relative to said work support in one direction parallel with the axis of said feed screw, and means for exerting resilient force between said screw-thread and work support in the direction of said feed screw opposite to the direction of the reaction of said rigidly held nut with respect to said feed screw.

In testimony whereof I affix my signature.

CORNELIS FRANCISCUS MARIA van BERKEL.